(12) United States Patent
Starr

(10) Patent No.: US 6,616,374 B2
(45) Date of Patent: Sep. 9, 2003

(54) TIRE ASSEMBLY FOR MOBILE IRRIGATION STRUCTURES

(76) Inventor: Donald G. Starr, 68196 Myers Rd., Summerville, OR (US) 97876

( * ) Notice: Subject to any disclaimer, the term of this patent is extended or adjusted under 35 U.S.C. 154(b) by 0 days.

(21) Appl. No.: 10/074,463

(22) Filed: Feb. 11, 2002

(65) Prior Publication Data

US 2002/0119008 A1 Aug. 29, 2002

Related U.S. Application Data

(60) Provisional application No. 60/268,316, filed on Feb. 12, 2001.

(51) Int. Cl.[7] ................................ B05B 3/00
(52) U.S. Cl. .................. 405/36; 239/728; 305/19; 305/180
(58) Field of Search ................ 305/182, 180, 305/19, 165, 160, 195, 187; 239/728, 723, 726; 405/36, 37, 39, 40, 41

(56) References Cited

U.S. PATENT DOCUMENTS 2,008,210 A * 7/1935 Hipkins ..................... 305/19
3,848,936 A * 11/1974 Tsuchiya et al. ............ 305/181
4,184,789 A * 1/1980 Gilde, Jr. .................... 405/36
4,332,424 A * 6/1982 Thompson .................. 305/180
5,354,124 A * 10/1994 James ........................ 305/162
6,131,833 A * 10/2000 Chapman .................... 239/728

* cited by examiner

Primary Examiner—Heather Shackelford
Assistant Examiner—Frederick Lagman
(74) Attorney, Agent, or Firm—James L. Wolfe

(57) ABSTRACT

The present invention provides a tire assembly for irrigation systems that prevents the formation of ruts caused by repeated travel along a path by tires of a mobile vehicle or structure. The tire assembly includes dual tires with a flexible belt member wrapped around the outer periphery of the two tires having a plurality of cleat members located on the outer surface of the flexible belt member. The cleat members direct water away from the center of the travel path. The flexible belt member further includes plural center guides to keep the belt in place. The tire assembly reduces soil compaction by providing a greater ground engaging surface area to more evenly distribute the weight of the equipment and by directing water away from the center of the travel path.

12 Claims, 2 Drawing Sheets

TIRE ASSEMBLY FOR MOBILE IRRIGATION STRUCTURES

This application claims priority from provisional patent application 60/268,316, filed Feb. 12, 2001.

TECHNICAL FIELD

This invention relates to irrigation systems and in particular to a tire assembly for mobile irrigation structures that prevents ruts from forming in the soil.

BACKGROUND OF THE INVENTION

Irrigation systems are commonly used in agricultural operations such as, for example, large scale commercial farms. One common type of such a system is a center-pivot irrigation system which typically employs an elongate boom that is connected at one end to a center pivot which acts as a water source for the boom. Typically, the boom is comprised of a plurality of pipes connected together extending away from the center pivot with sprinklers or other watering devices located along the length of the boom to spray water across the soil. The boom is elevated and supported by a number of mobile towers with wheels for transport across the ground. One of the towers acts as a drive tower so that the boom travels in wide circles about the center pivot. Some of the center pivot systems employ a corner sweep unit for systems that are located near the corner of a plot of land. The corner sweep unit is located at the end of the boom opposite the center pivot. The corner sweep unit pivots about it's own axis as the corner sweep unit approaches the corner of the property as the boom rotates. Corner sweep units maximize the use of irrigation water in tight corners to ensure irrigation of the most amount of soil. Another common type of irrigation equipment is known as a linear system that typically uses the same type of equipment described above but that travel along a straight path instead of a circular path. These irrigation systems are typically repeatedly driven along their paths for a period of time to adequately irrigate the land.

These irrigation systems create very wet soil conditions over which the irrigation equipment must necessarily travel. Most current irrigation equipment systems employ tires that have a tread such as, for example, a tractor tread tire on the towers to move the system across the ground. One problem with such tires is that the tread in the tires directs water to the center of the path along which the tire travels causing further saturation of the soil creating a very muddy and soggy travel path. Because the irrigation systems are driven over the same path for long periods of time ruts eventually develop along the path. The weight of the irrigation equipment along with the soggy soil along the travel path contributes to the formation of ruts. Depending on the type of soil and how long the irrigation system travels over the same path the ruts can become several feet deep. Ruts as deep as five or six feet deep have been known to be formed.

These ruts cause several problems. One problem is that the tires of the tower may become stuck so that the tower is unable to continue along the path. With very deep ruts, parts of the tower itself may engage the ground and may become stuck. For example, the towers form a frame that supports the boom and the tires. The frame may include cross struts that extend between front and back members of the frame located several feet above the ground surface. Some ruts are so deep that the cross struts are at ground level and drag along the ground surface and may become stuck. Parts of the irrigation equipment may experience damage or failure. Furthermore, a tractor or other large vehicle must be utilized to pull the tower from its stuck position. This increases the time and expense of irrigation.

Another problem caused by ruts is that they can damage other agricultural vehicles that travel across the field. For example, some commercial farm vehicles such as fertilizers typically travel across a crop field at a speed of about 15 mph. Some of these vehicles use a boom of between 80–100 ft. long to disperse fertilizer across the crop field. Other vehicles or equipment such as hay balers and harvesters carry heavy loads. Traveling across ruts at such speeds puts great stress on the vehicles and they may experience damage. Significant damage may occur with very deep ruts. In order to avoid damage the vehicles must slow down each time a rut is encountered. Since the vehicles are unable to travel at a constant speed production time and labor costs are increased.

Yet another problem caused by ruts is erosion. Erosion is a problem encountered with many agricultural endeavors. Ruts magnify the erosion problem by providing a channel in which the irrigation water or rain water washes away topsoil. This is especially problematic on land that slopes or on farmed land located on hillsides. In some instances the washed-away soil may be recovered and hauled back to its original location. If the washed-away soil is not recoverable new soil must then be brought in and distributed over the eroded land. In addition to damage to the land such erosion causes increased expense for soil recovery and/or replacement.

Some attempts to solve the problem with ruts include filling the ruts with straw, wood chips, compost, gravel, concrete or debris. This attempt has not proved to be acceptable because of land pollution and contamination issues. Successive land owners may experience damage to some equipment and may be required at great expense to clean up and remove the fill material. If contamination of the soil is an issue additional costs must be incurred to remove such contaminants.

Other attempts to fill the ruts include the use of commercially available clotting pellets or other clumping material that hardens when wet. However, such products have proved to be inconsistently effective. Additionally, these products must be purchased every time a rut is formed which increases costs and requires continued maintenance.

One prior art device that attempts to prevent formation of ruts utilizes a ground engaging track for the tower wheels. The track comprises flat plates or sections that are hinged together around the tire. The device has side walls that extend down the sides of the tire. The problem with such a device is that the hinges wear out which may cause damage and require repair or replacement of the device. The side walls of the device also pinch the sides of the tires causing wear and damage to the tires. Additionally, if the device encounters a rocky patch in the soil the device may get stuck or stall causing the tire to spin inside the track. Furthermore, such a device experiences vibration which loosens lug nuts on wheels and causes noise.

Other attempts to prevent ruts from forming include the use of steel wheels. However, such wheels are very heavy and place a great deal of stress on the axle and/or gear box of the tower drive mechanism. Additionally, such steel wheels require a vehicle such as, for example, a front end loader to attach the steel wheel to the tower.

SUMMARY OF THE INVENTION

The present invention provides a device for irrigation systems that prevents the formation of ruts caused by repeated travel along a path by tires of a mobile vehicle or structure. The irrigation system includes an elongate boom connected at one end to a center pivot which acts as a water source for the boom. The boom includes a plurality of pipes connected together to extend away from the center pivot with sprinklers located along the length of the boom to spray water across the soil. The boom is elevated and supported by a number of mobile towers each of which has a tire assembly for transporting the tower and, thus, the boom across the ground in wide circles about the center pivot.

Each tire assembly includes dual tires mounted on an axle with a flexible belt member wrapped around the outer periphery of the two tires. The flexible belt member includes a plurality of cleat members located on the outer surface of the flexible belt member. The cleat members comprise channel elements that extend across the width of the flexible belt member. The channel elements have opposed side walls extending away from a base connected to the outer surface of the flexible belt member. At least one center guide and preferably a plurality of center guides are connected to the inner surface of the flexible belt member to keep the belt in place.

The flexible belt member is essentially a flat member having a length and a width and is adapted to be wrapped around the dual tires so that the center guides are located between the tires and the cleat members are located on the outer periphery of the tire assembly. The flexible belt member includes means to secure the ends of the flexible belt member when it is mounted on the tire assembly.

The tire assembly reduces soil compaction by providing a greater ground engaging surface area to more evenly distribute the weight of the equipment. Furthermore, the cleat members engage the ground to provide traction and to direct water away from the center of the travel path to the outer sides of the travel path. Therefore, the tire assembly of the present invention substantially prevents ruts from forming in loose soil and/or wet ground conditions.

Most center pivot irrigation systems are designed so that the tires on the mobile structure are canted or mounted on an angle from the vertical extending away from the center pivot. Another aspect of the invention is to inflate one tire to an inflation pressure that is approximately twice that of the other tire. Specifically, the inner tire or the tire located toward the center pivot is inflated to about twice the pressure of the outside tire. This prevents too much torque pressure from being applied to the tire assembly drive mechanism.

The invention is particularly effective in wet or loose soil environments created by irrigation systems and/or farming activities for large or commercial farms. Although the invention is described as being used primarily with center pivot irrigation systems. However, it is contemplated that the present invention not be limited to center pivot irrigation systems but may also be used with other irrigation systems such as, for example, linear irrigation systems and other mobile structures in which the formation of ruts in the ground is a problem.

It is therefore an object of the present invention to provide a tire assembly for mobile structures that substantially prevents ruts from forming in the ground.

Another object of the invention is to provide a tire assembly that provides a greater ground engaging surface area over which the weight of the equipment is distributed to reduce soil compaction.

Still another object of the invention is to provide a tire assembly that directs water away from the center of the travel path.

A further object of the invention is to provide a tire assembly that can be assembled with two people.

Yet another object of the invention is to reduce soil erosion, pollution, and contamination.

Still another object of the invention is to provide a tire assembly for use with a variety of irrigation systems.

Another object of the invention is to provide a rut prevention device that is economical in manufacture and durable in use These and other objects will be apparent to those skilled in the art.

DETAILED DESCRIPTION

Figure 1:
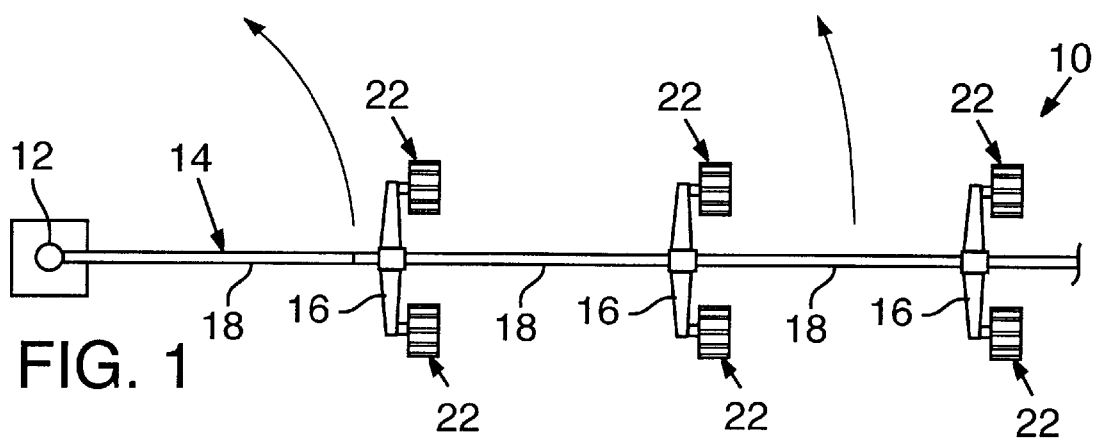
FIG. 1 is a top plan view of a simplified center pivot irrigation system utilizing mobile support structures to support an elevated boom.
Figure 2:
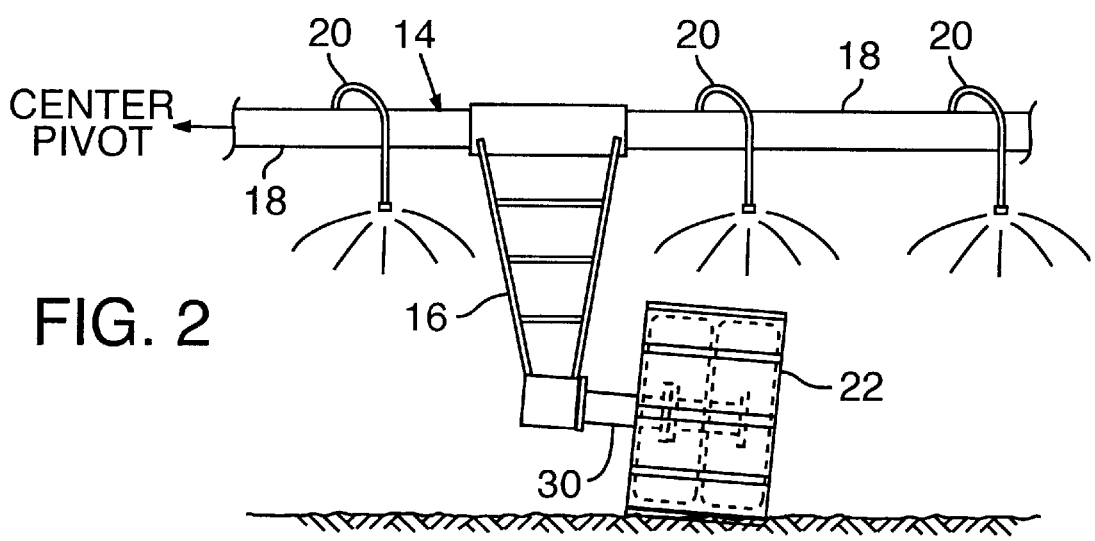
FIG. 2 is a partial plan view of a mobile support structure with a tire assembly of the present invention.

Referring now to FIGS. 1 and 2, a center pivot irrigation system 10 is shown in accordance with the present invention wherein the system 10 is adapted to rotate about a center pivot 12 that serves as a water supply for an elevated boom 14 supported on a plurality of mobile support structures or towers 16. Although these figures illustrate a center pivot irrigation system the present invention is not intended to be limited to center pivot irrigation systems. Additionally, although only one boom 14 and three mobile towers 16 are shown the present invention is not intended to be limited to the number or booms or mobile tower structures. The number of towers depends of the length of the boom which is dependent on the size of the area of land to be irrigated. For example, the span between the mobile towers 16 is typically between 130–140 ft. However, this length may vary.

As seen in FIGS. 1 and 2, the centrally located pivot structure 12 serves as a water supply to the boom 14. The boom 14 comprises a plurality of pipes 18 connected end-to-end with sprinklers 20 spaced along the length of the boom 14. The boom 14 is supported by the mobile towers 16 that have ground engaging means 22 to propel the boom 14 along a travel path about the central pivot 12. The towers 16 are self-propelled by the ground engaging means 22 which are driven by a drive mechanism (not shown).

Figure 3:
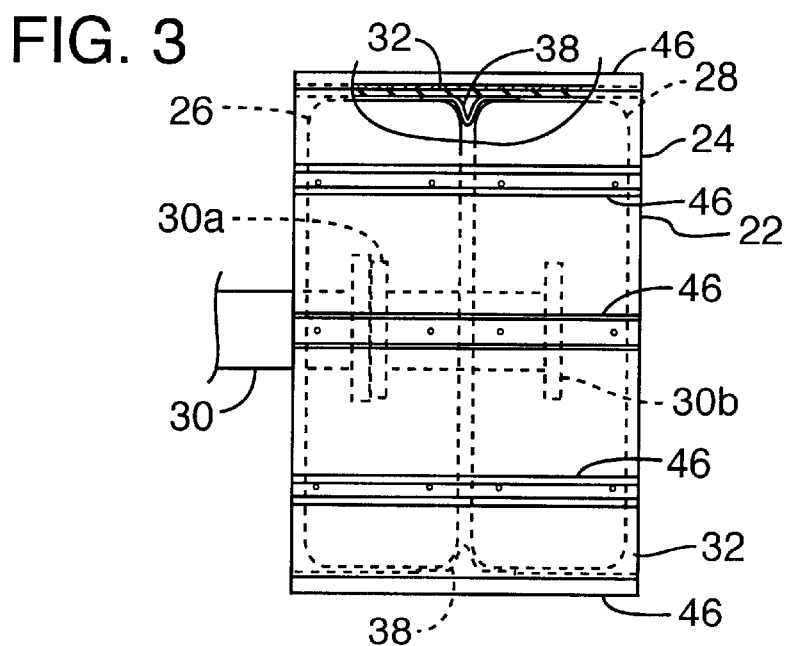
FIG. 3 is a front view of the tire assembly of the present invention.
Figure 4:
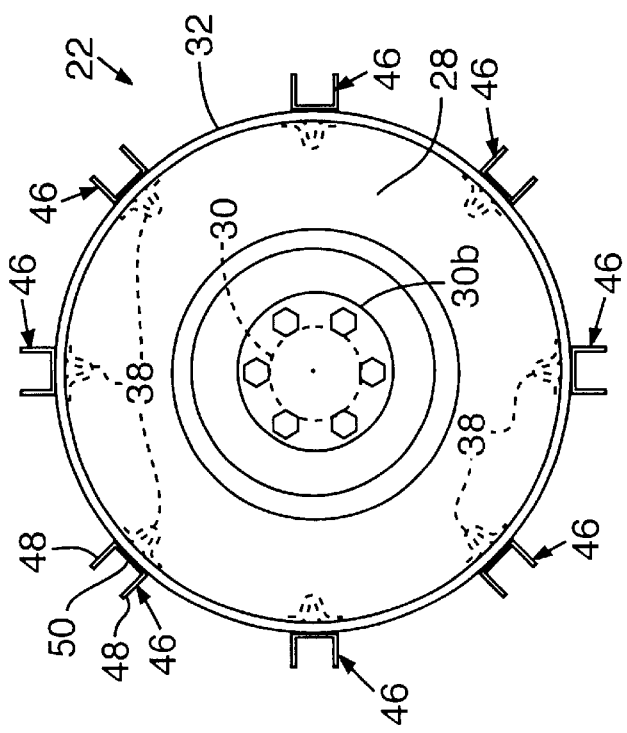
FIG. 4 is a side view of the tire assembly of the present invention.

As seen more clearly in FIGS. 2–4, the ground engaging means is shown as comprising a tire assembly 24 comprising dual fires 26 and 28 mounted for rotation on a hub 30. The hub 30 includes flanges 30a and 30b on each end having bolt holes matching the bolt hole configuration on the wheels. One of the flanges 30a is connected to a flange on the axle from the gearbox. The hub 30 acts as an extension to accommodate mounting of the dual tires 26 and 28. FIG. 2 shows that the tire assembly 24 is canted or mounted on an angle to a vertical axis. This is done to prevent the application of too much force or pressure on the axle and/or gear box of the drive mechanism as the system 10 is driven around its travel path. For example, tires that are mounted normal to the boom and supported on an axle positioned normal to the tower have the tendency to follow a straight path. However, the tires are forced from a straight path by the center pivot structure so that the tires travel in a circular path. This puts a great deal of stress on the axle and/or gear box of the drive mechanism as well as causing wear on the tires. The tire assembly 24 of the present invention is capable of having a canted mounting by inflating one of the tires to a pressure of about twice that of the other tire. For example, the tire 26 closest to the center pivot, referred to as the inner tire, may have an inflation pressure of about 28–30 psi and the other tire 28, referred to as the outer tire, may have an inflation pressure of about 10–12 psi. Thus, the tires 26 and 28 counteract the force from the center pivot 12 tending the pull or force the tires 26 and 28 toward the center.

Figure 5:
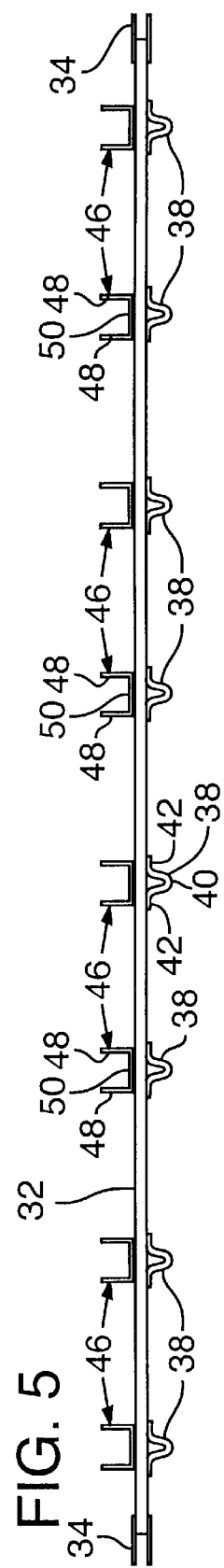
FIG. 5 is a side view of the flexible belt in a flat condition.

The tire assembly 24 includes a flexible belt 32 wrapped around the outside of the tires 26 and 28 The flexible belt 32 is made of a flexible material such as, for example, rubber that has a substantially flat shape before mounting on the tires 26 and 28 as seen in FIG. 5. The flexible belt 32 has a length and a width with opposed ends having a coupler 34 such as, for example, belt lacing to connect the opposed ends so that the flexible belt 32 has a circular shape. In order to mount the flexible belt 32 onto the tires 26 and 28 they are deflated. After the flexible belt 32 is mounted on the tires 26 and 28 they are inflated to their respective inflation pressures as described above. The length and width of the flexible belt 32 varies according to the size of tires used. For example, with 14.9×24 tires the flexible belt has a length of about 156 inches and has a width of about 30 inches. For 11.2×24 tires the flexible belt has a length of about 139 inches with a width of about 24 inches.

The flexible belt 32 has an inner surface 36 that lies adjacent to outer surface of the tires 26 and 28 when mounted thereon. At least one and preferably a plurality of center guides 38 are mounted to the inner surface 36 of the flexible belt 32. Each center guide 38 is preferably a formed metal piece having a central protrusion 40 with flat ends 42 for connection to the inner surface 36 of the flexible belt 32 by a suitable connector. The center guides 38 help keep the flexible belt 32 in place The outer surface 44 of the flexible belt 32 includes a plurality of cleat elements 46 that substantially extend across the width of the flexible belt 32. The cleat elements 46 are in the form of channel iron having side walls 48 extending outwardly from a base 50. The base 50 is secured to the outer surface 44 of the flexible belt 32 by a suitable connector so that the side walls 48 engage the ground as the tire assembly 24 moves along the travel path. The side walls 48 act to direct water to the outer sides of the tire assembly 24 and, thus, away from the center of the travel path.

The tire assembly 24 of the present invention reduces soil compaction by providing a greater ground engaging surface area to distribute the weight of the irrigation equipment. For example, some prior center pivot irrigation systems can produce a force of about 86 pounds per square inch depending on the size of the tire. Using tires of comparable size the dual tire assembly of the present invention produces a force of only about 26 pounds per square inch. Thus, the reduction of soil compaction plus the direction of water away from the center of the travel path substantially reduces the formation of ruts in the ground.

While the invention has been particularly shown and described with reference to a preferred embodiment thereof, it will be understood by those skilled in the art that changes in form and detail may be made therein without departing from the spirit and scope of the invention.

What is claimed is:

1. An irrigation system having an elongate boom having a plurality of sprinklers connected to a water supply and supported above the ground to supply water to a selected ground area; comprising:

plural tower structures that support the boom, each tower structure having a tire assembly for moving the tower structures repeatedly along a travel path having outer sides, the tire assembly having a width and including two tires mounted side-by-side on an axle with a flexible member mounted on the two tires about their outer periphery so that the flexible member engages the ground as the tires rotate to move the towers across the ground, the flexible member including plural around engaging elements, wherein one of the two tires has an inflation pressure less than the other of the two tires.

2. The irrigation system of claim 1, wherein the ground engaging elements direct water away from the center of the travel path.

3. The irrigation system of claim 1, wherein the ground engaging elements comprise a plurality of cleats that extend across the width of the tire assembly.

4. The irrigation system of claim 3, wherein the cleats comprise channel-shaped members having opposed side walls extending away from a base.

5. The irrigation system of claim 4, wherein the cleats are connected to the tire assembly at the base so that the side walls extend outwardly from the tire assembly.

6. The irrigation system of claim 1, wherein the flexible member has an inner side engaging the outer periphery of the tires and an outer side that engages the ground, the outer side including elements that extend outwardly therefrom to provide traction and to direct water away from the travel path.

7. The irrigation system of claim 6, wherein the elements comprise a plurality of cleats extending across the width of the tire assembly.

8. The irrigation system of claim 1, wherein one of the two tires has an inflation pressure of about half of the inflation pressure of the other of the two tires.

9. A tire assembly for moving a mobile irrigation system along a travel path; comprising:

first and second tires each having an outer periphery and mounted side-by-side on an axle, wherein one of the first and second tires has an inflation pressure less than the other of the first and second tires, and a flexible member mounted about the outer periphery of the first and second tires, the flexible member having an outer ground engaging surface that engages the ground as the tires rotate to provide a surface area over which weight of the irrigation system is distributed to prevent formation of ruts.

10. The tire assembly of claim 9, further comprising cleat elements mounted on the flexible member to direct water away from a center of the travel path.

11. A device for mounting onto a tire assembly for moving a mobile irrigation system along a travel path, the tire assembly including first and second tires each having an outer periphery and mounted on an axle, wherein one of the first and second tires has an inflation pressure less than the other of the first and second tires, the device comprising:

a flexible belt member having an inner surface that engages the outer periphery of the first and second tires and an outer surface that engages the travel path to provide a surface area over which weight of the irrigation system is distributed to prevent formation of ruts.

12. The device of claim 11, further comprising a plurality of cleat members spaced along the flexible belt member and extending across the flexible belt member to direct water away from a center of the travel path.

* * * * *